(12) United States Patent
Goldfarb et al.

(10) Patent No.: US 11,244,249 B2
(45) Date of Patent: Feb. 8, 2022

(54) MACHINE LEARNING TEMPLATES IN A MACHINE LEARNING FRAMEWORK (71) Applicant: General Electric Company, Schenectady, NY (US)

(72) Inventors: Helena Goldfarb, Niskayuna, NY (US); Abhay Harpale, San Ramon, CA (US); Hao Huang, San Ramon, CA (US); Achalesh Pandey, San Ramon, CA (US)

(73) Assignee: General Electric Company, Schenectady, NY (US)

( * ) Notice: Subject to any disclaimer, the term of this patent is extended or adjusted under 35 U.S.C. 154(b) by 787 days.

(21) Appl. No.: 15/809,362

(22) Filed: Nov. 10, 2017

(65) Prior Publication Data
US 2018/0137093 A1 May 17, 2018

Related U.S. Application Data (60) Provisional application No. 62/420,768, filed on Nov. 11, 2016.

(51) Int. Cl.
G06F 17/24 (2006.01)
G06N 99/00 (2019.01)
G06F 17/22 (2006.01)
G06F 3/0484 (2013.01)
G06N 20/10 (2019.01)
G06N 20/00 (2019.01)
G06F 40/186 (2020.01)
G06F 40/143 (2020.01)

(52) U.S. Cl.
CPC ......... *G06N 20/10* (2019.01); *G06F 3/04847* (2013.01); *G06F 40/143* (2020.01); *G06F 40/186* (2020.01); *G06N 20/00* (2019.01)

(58) Field of Classification Search
None
See application file for complete search history.

(56) References Cited

U.S. PATENT DOCUMENTS

| 7,725,419 | B2 | 5/2010 | Lee et al. | |
| 9,696,971 | B1* | 7/2017 | Wierda | G06F 8/41 |
| 9,773,219 | B2* | 9/2017 | Sankaran | G16B 15/00 |
| 10,354,349 | B2* | 7/2019 | Sankaran | G06Q 10/0633 |
| 2008/0114710 | A1 | 5/2008 | Pucher | |
| 2009/0119095 | A1 | 5/2009 | Beggelman et al. | |
| 2014/0006012 | A1 | 1/2014 | Zhou et al. | |
| 2014/0075413 | A1* | 3/2014 | Binjrajka | G06F 8/30 717/121 |

(Continued)

OTHER PUBLICATIONS

Datta, Digital Twin Presentation, IIConsortium, 2015, 32 pp.

(Continued)

*Primary Examiner* — Umut Onat
(74) *Attorney, Agent, or Firm* — Buckley, Maschoff & Talwalkar LLC (57) ABSTRACT According to some embodiments, a system and method are provided to create a template associated with an industrial problem. The method comprises receiving one or more kernels from a machine learning library. The one or more kernels are then aggregated, via a processor, into a template. The template is integrated into a user interface where is may be executed.

20 Claims, 9 Drawing Sheets (56) References Cited

U.S. PATENT DOCUMENTS

| | | | | |
|---|---|---|---|---|
| 2014/0279908 A1* | 9/2014 | Manfe | .................... | G06F 16/10 |
| | | | | 707/639 |
| 2017/0315789 A1* | 11/2017 | Lam | .................... | G06Q 10/067 |
| 2018/0060738 A1* | 3/2018 | Achin | .................... | G06Q 10/04 |

OTHER PUBLICATIONS

Stephane et al., Multi-Scale Methods for Fracture: Model learning Across Scales Digital Twinning and Factors of Safety, Empa's topical day on "Multiscale high-performance computational modelling", Nov. 18, 2015, 1 pg.

Floyd, The Future of PLM in the Cloud, Microsoft's Discrete Manufacturing Solutions, Jun. 21, 2016, 4 pp.

Meyertons, An Open Framework for Accelerated Grid Research, Energy Technology Summit, Jul. 19, 2016, 2 pp.

Heppelmann, 3D Systems (DDD) 2016 Strategy and Solutions Event Conference (Transcript), 3D Systems Corp, Sep. 12, 2016, 33 pp.

Panetta, Artificial Intelligence, Machine learning, and Smart Things Promise an Intelligent Future, Itango.eu, Oct. 18, 2016, 7 pp.

\* cited by examiner

| Kernel ID | Kernel feature | Kernel feature | Kernel feature | Kernel feature | Kernel feature |
|---|---|---|---|---|---|
| 1 | | | | | |
| 2 | | | | | |
| 3 | | | | | |

FIG. 7

MACHINE LEARNING TEMPLATES IN A MACHINE LEARNING FRAMEWORK

BACKGROUND

Maintenance of various machines such as, but not limited to, engines, turbines, rail vehicles and aircraft, is essential for the longevity of the machines. Early detection and diagnosis of problems, or potential problems, associated with the machines may help avoid loss of use of the machines as well as prevent secondary damage. For example, various components of a machine may breakdown over time and failure to diagnose and repair these breakdowns may lead to loss of use of the machine or, in some cases, the breakdowns may cause damage to other components of the machine thus causing secondary damage.

Being able to determine anomalies from a plurality of sensor data may be difficult for users who don't have intimate knowledge about how to manipulate sensor data to provide useable results. It would therefore be desirable to provide a system to facilitate a user's ability to determine problems or potential problems identified in raw sensor data as well as simply how a user may obtain usable information from raw sensor data associated with a machine.

SUMMARY

According to some embodiments, a system and method are provided to create a template associated with a data-driven solution to an industry problem, for example anomaly detection, fault detection, and/or various data-driven approximations. The method may comprise using one or more kernels from a machine learning library. The one or more kernels are then aggregated, via a wrapper code, into a template. The template may be integrated into a user interface where it may be executed or used in an application or a script. A technical advantage of some embodiments disclosed herein is improved systems and methods to provide functionality to users to assemble kernels into pipelines/workflows to solve a particular problem or problems associated with a machine.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present embodiments described herein relate to a system and method of creating a template associated with the analysis (e.g., detection of anomalies) of raw sensor data. The method comprises integrating (e.g., receiving) one or more kernels from a machine learning library. The one or more kernels may be aggregated, via a wrapper code, into a template. The template may then be integrated into a machine learning framework that has user interface where it may be executed.

Furthermore, the present embodiments relate to a novel framework for creating templates to support domain-specific problems. The templates may also comprise compound kernels to provide solutions to industrial-related problems. In some embodiments, each kernel may be considered as an algorithm and each template may comprise a comprehensive suite of algorithms such as, but not limited to, data quality assessment algorithms, missing value imputation algorithms, outlier removal algorithms, feature engineering algorithms, classifiers, regressions, anomaly detection algorithms and post-processing algorithms. Kernels may be non-platform specific. For example, while each kernel may be specific to an industrial related problem, each kernel may not comprise an input and output that is tailored to a specific platform or operating system. Instead, kernels may be use a standardized set of variables so that various kernels may be able to pass information between each other.

Figure 1:
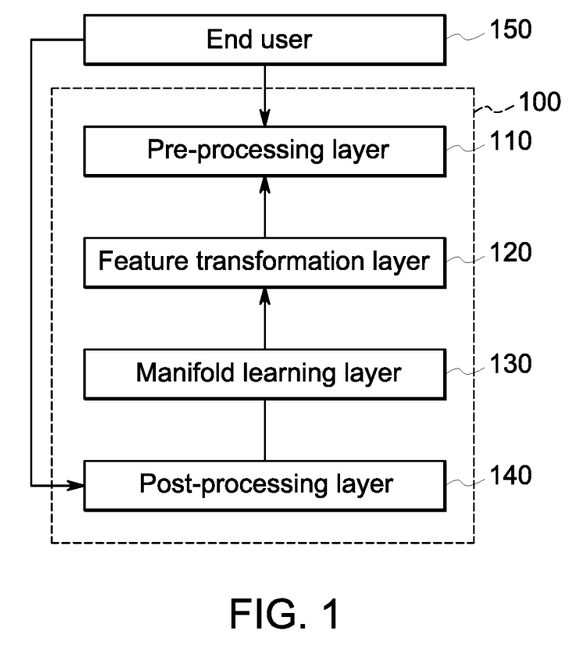
FIG. 1 is a template framework in accordance with some embodiments.

Now referring to FIG. 1, an embodiment of a template framework 100 is illustrated. As illustrated in FIG. 1, the template framework may comprise a pre-processing layer 110, a feature transformation layer 120, a learning layer 130 and a post-processing layer 140. The template framework 100 may be created by an end user 150 using a template editor as described herein and each template framework may comprise a selection of algorithms in each step of its creation. The selection of algorithms may be relevant for solving a specific industrial problem.

For purposes of illustrating features of the present embodiments, a simple example will now be introduced and referenced throughout the disclosure. Those skilled in the art will recognize that this example is illustrative and not limiting and is provided purely for explanatory purposes.

Figure 2:
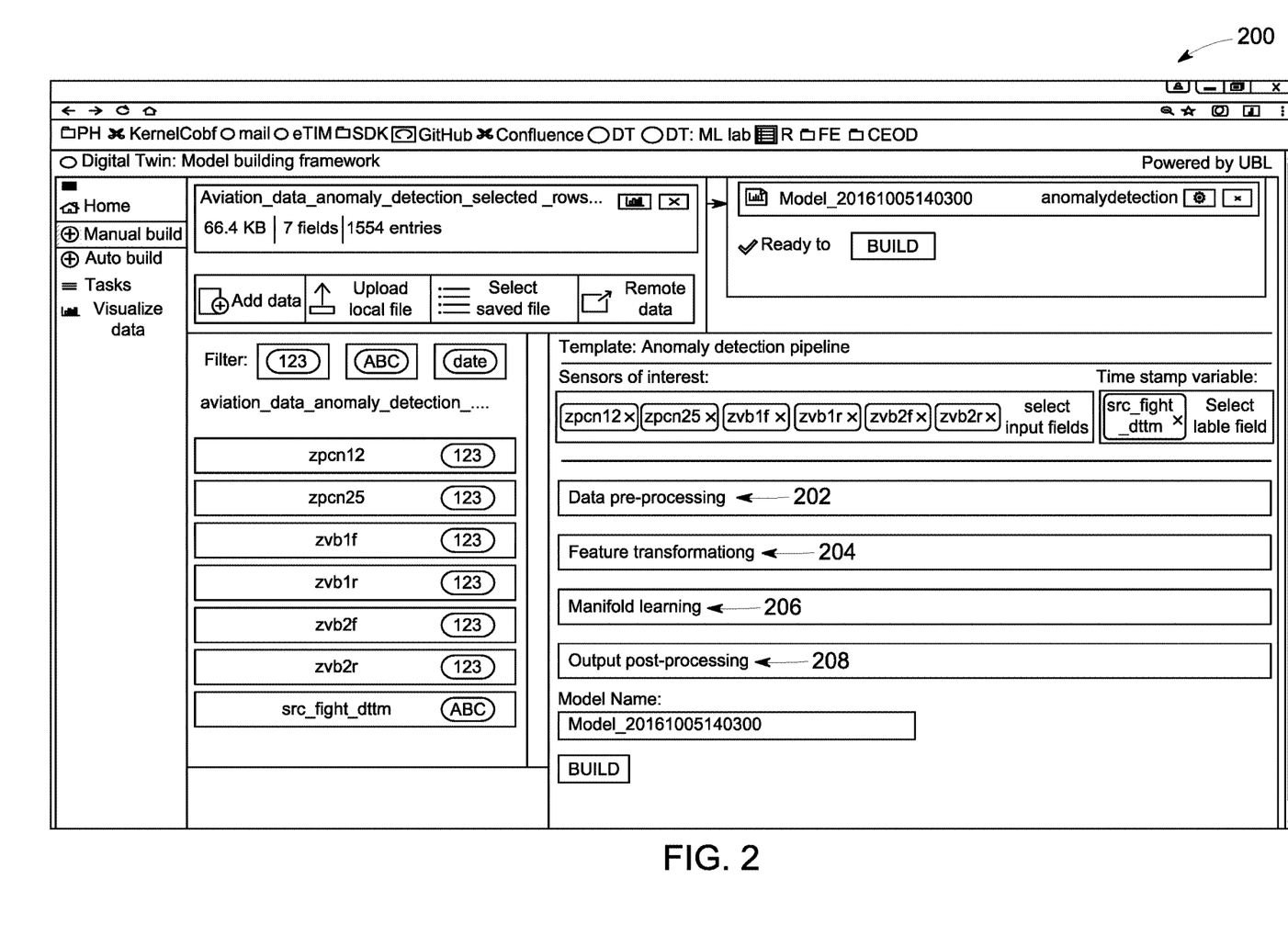
FIG. 2 illustrates a template integrated in a machine learning framework and a user interface that users may use to change a template's hyperparameters and perform the template's algorithm selection in accordance with some embodiments.

Referring to FIG. 2, an embodiment of a first screen 200 of a template editor is illustrated. This example may illustrate the configuration of an anomaly detection template that may be used to determine anomalies in raw time-series data. As illustrated in FIG. 2, an end user, such as end user 150 may select elements from a plurality of elements to add to a template. In this example, the end user has added the following elements: data pre-processing 202, feature transformation 204, manifold learning 206 and output post processing 208.

Referring back to FIG. 1, the pre-processing layer 110, such as data pre-processing 202, may be used to modify data, such as raw time-series data, prior to extracting features from the data. For example, pre-processing may comprise a high-pass filter to remove possible temperature bias from the signal or may remove known test or repair data from the received data. Furthermore, the pre-processing layer 110 may be associated with one or more data pre-processing kernels (e.g., normalizing kernels, outlier removal kernels, smoothing kernels).

Figure 3A:
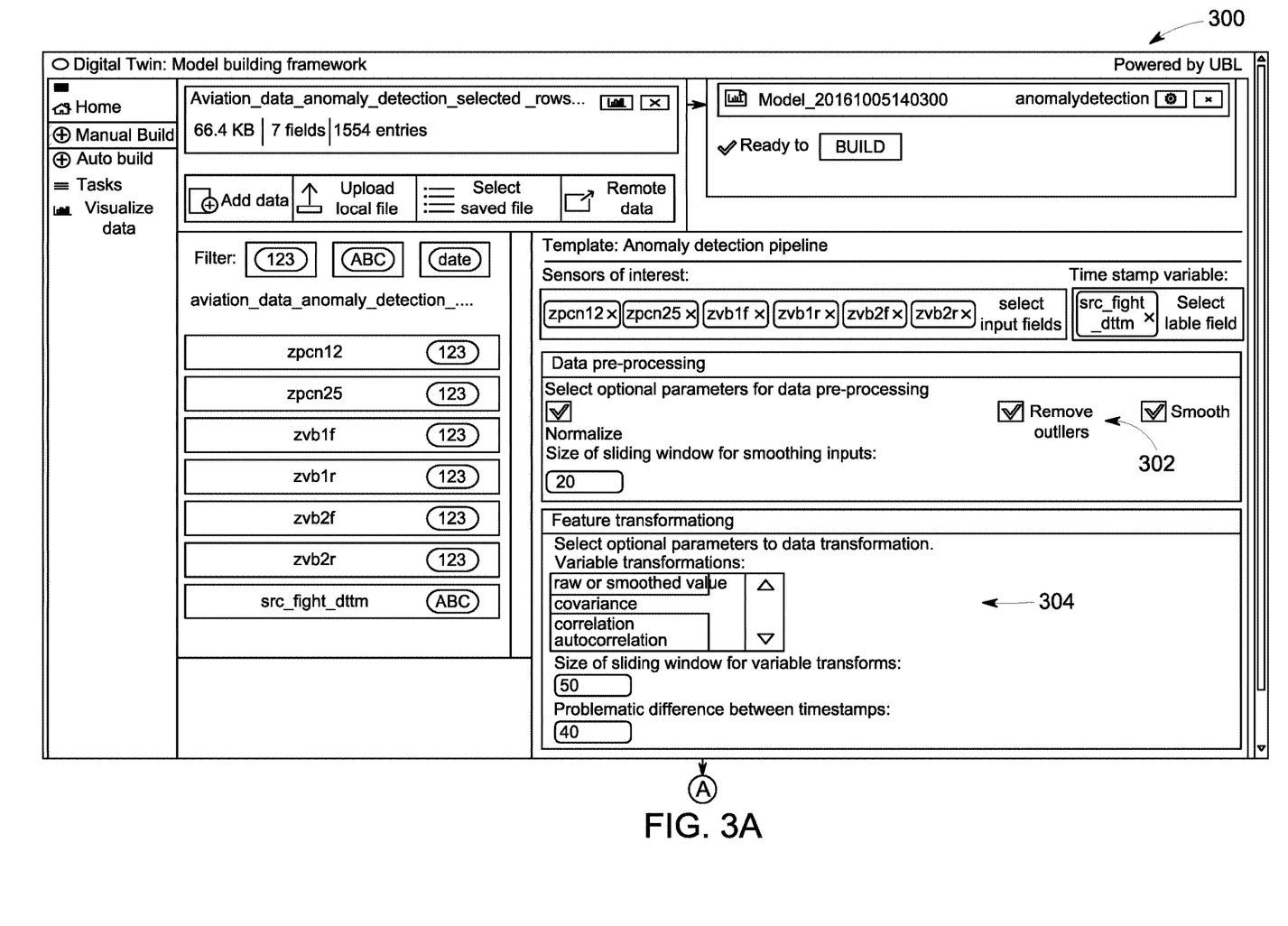
FIG. 3A illustrates a portion of a template integrated in a machine learning framework and a user interface that users may use to change a template's hyperparameters and perform the template's algorithm selection in accordance with some embodiments.
Figure 3B:
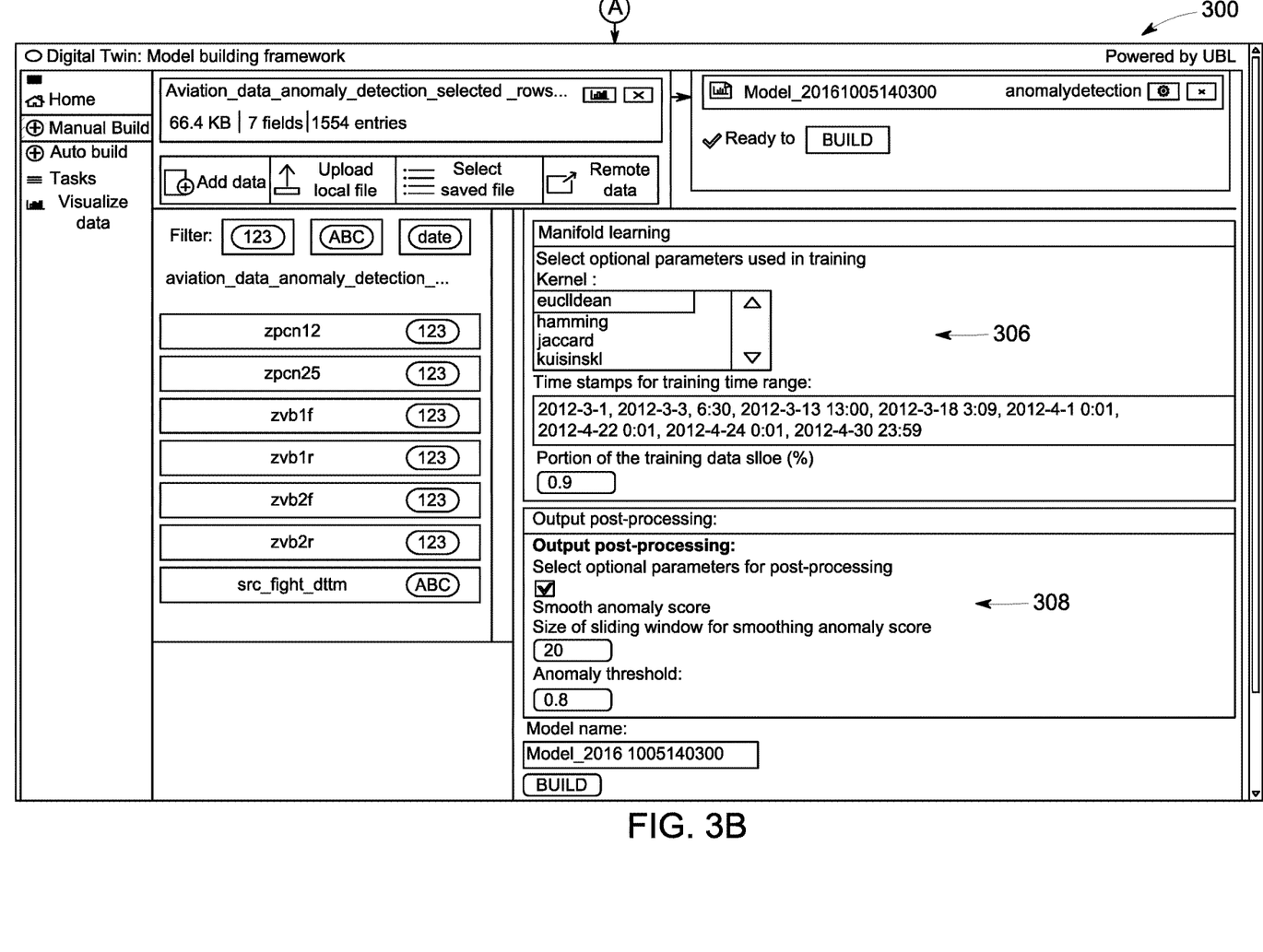
FIG. 3B illustrates a portion of a template integrated in a machine learning framework and a user interface that users may use to change a template's hyperparameters and perform the template's algorithm selection in accordance with some embodiments.

Referring now to FIG. 3, an embodiment of a second screen 300 of a template editor is illustrated. The second screen 300 may illustrate a data pre-processing input portion 302 that defines options for a user to select. For example, the second screen 300 may illustrate a checkbox for a user to indicate that the input data should be normalized, a check box for a user to indicate that outliners (e.g., data that lies an abnormal distance from other values) should be removed and/or a checkbox for a user to indicate that smoothing should be applied to the raw time-series data. Furthermore, the input portion 302 may illustrate an input area for a user to indicate a size of a sliding window for smoothing the input data.

Referring back to FIG. 1, once the pre-processing layer 110 has been defined, a feature transformation layer 120 may be defined. The feature transformation layer 120 may be associated with its own specific group of kernels. For example, the feature transformation layer 120 may be associated with kernels for variable transformations such as, but not limited to, raw or smoothed values, covariance, correlation, and auto correlation. Referring to FIG. 3, a feature transformation input portion 304 may define areas for a user to enter a type of transformation that will be executed against the time-series data after it has been pre-processed. Furthermore, the feature transformation input portion 304 may provide an area for a user to enter a size of a sliding window for variable transforms and an area to enter a timestamp ranges of slices of data that should be excluded from analyses.

Referring back to FIG. 1, once the transformation layer 120 of the template has been defined, a manifold learning layer 130 may be defined. Manifold learning may relate to reducing a number of dimensions in data. In the present example, the manifold learning layer 130 may be associated with its own group of kernels and, in particular, kernels that are created for the purpose of reducing a number of dimensions in input data and outputting a reduced dimension set. Referring again to FIG. 3, a manifold learning input portion 306 may define areas for a user to enter a type of manifold learning kernel to execute against the time-series data (e.g., presenting a dropdown box of known kernels to the user) and an area to enter timestamps for defining a training time range. The manifold learning input portion 306 may also define an area to enter a portion of the training data slice (e.g., a percentage of the data slice) that will be used.

Referring back to FIG. 1, once the manifold learning layer 130 of the template has been defined, a post-processing layer 140 may be defined. Post-processing may relate to how the data will be viewed or interpreted by an end user. Like the previous layers, the post-processing layer 140 may be associated with its own group of kernels and, in particular, kernels that are created for the purpose of viewing and interpreting data. For example, and now referring to FIG. 3A and FIG. 3B, an output post-processing portion 308 may define areas for a user to enter optional parameters for post-processing such as, but not limited to, a check box to smooth an anomaly score, an entry area to enter a size of a sliding window for smoothing the anomaly score and an area to enter an anomaly threshold. Furthermore, the post-processing layer 140 may define an area for a user to enter a model name and a button that, when activated by the user, will train the template. In some embodiments, the template may also be executed in response to the user activating the button.

Each of the transformation kernels, manifold Learning kernels and post-processing kernels in the template may be developed to aid in determining a solution of a particular industrial problem of a specific domain (e.g., aircraft engines, rail vehicles, car engines, etc.). For example, a particular industrial problem may comprise detecting anomalies in high dimensional time-series data. In some embodiments, each kernel in the template may comprise default parameters that may be changed by domain experts if needed. Users can select one or more kernels to be executed in each step of a template and each kernel may utilize default values that are associated with the particular kernel. The default values may also be stored with each kernel in the machine learning library. The kernels may use common variables between different kernels such that kernels can be daisy chained to create a solution to an industrial problem.

Figure 4A:
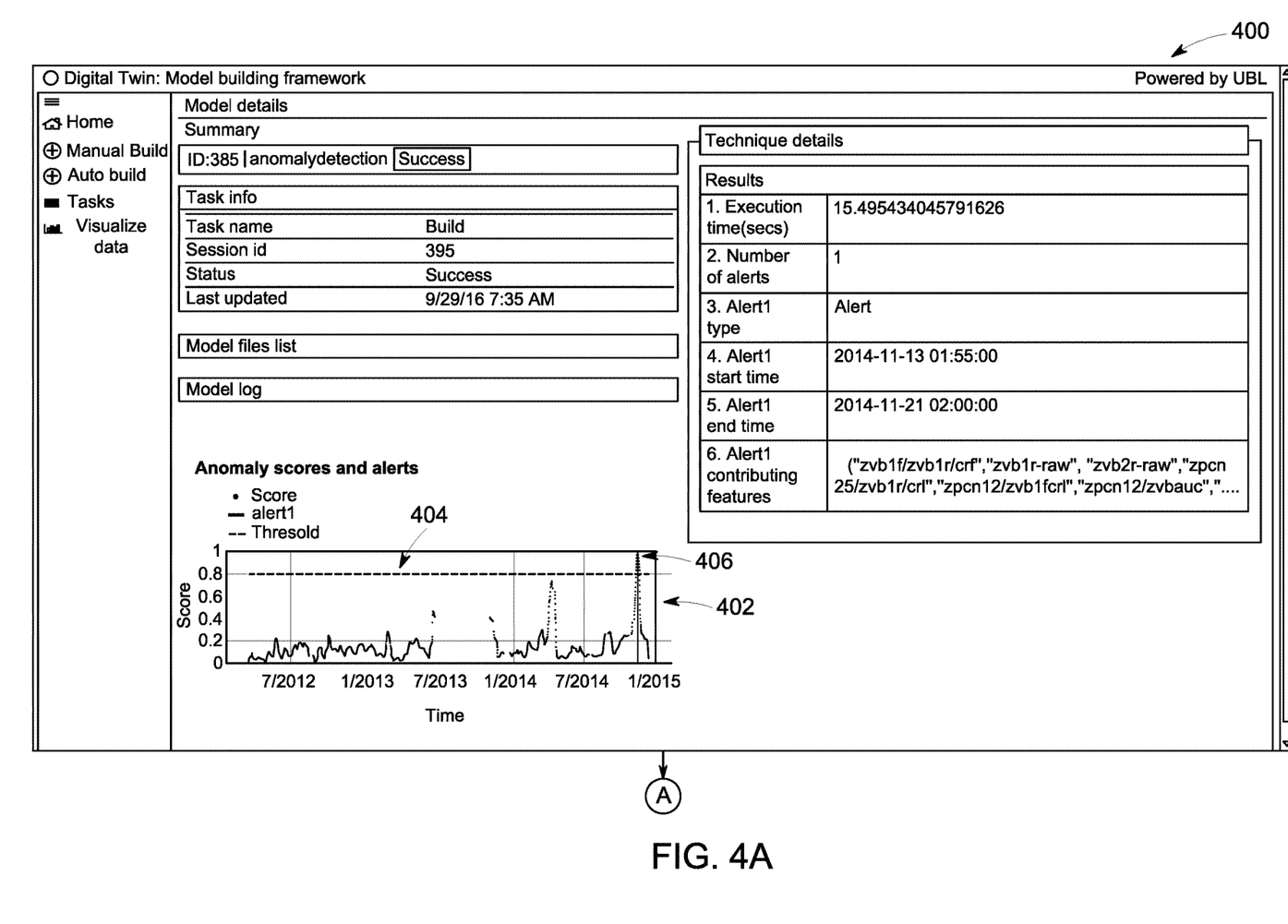
FIG. 4A illustrates an output of a template according to some embodiments.
Figure 4B:
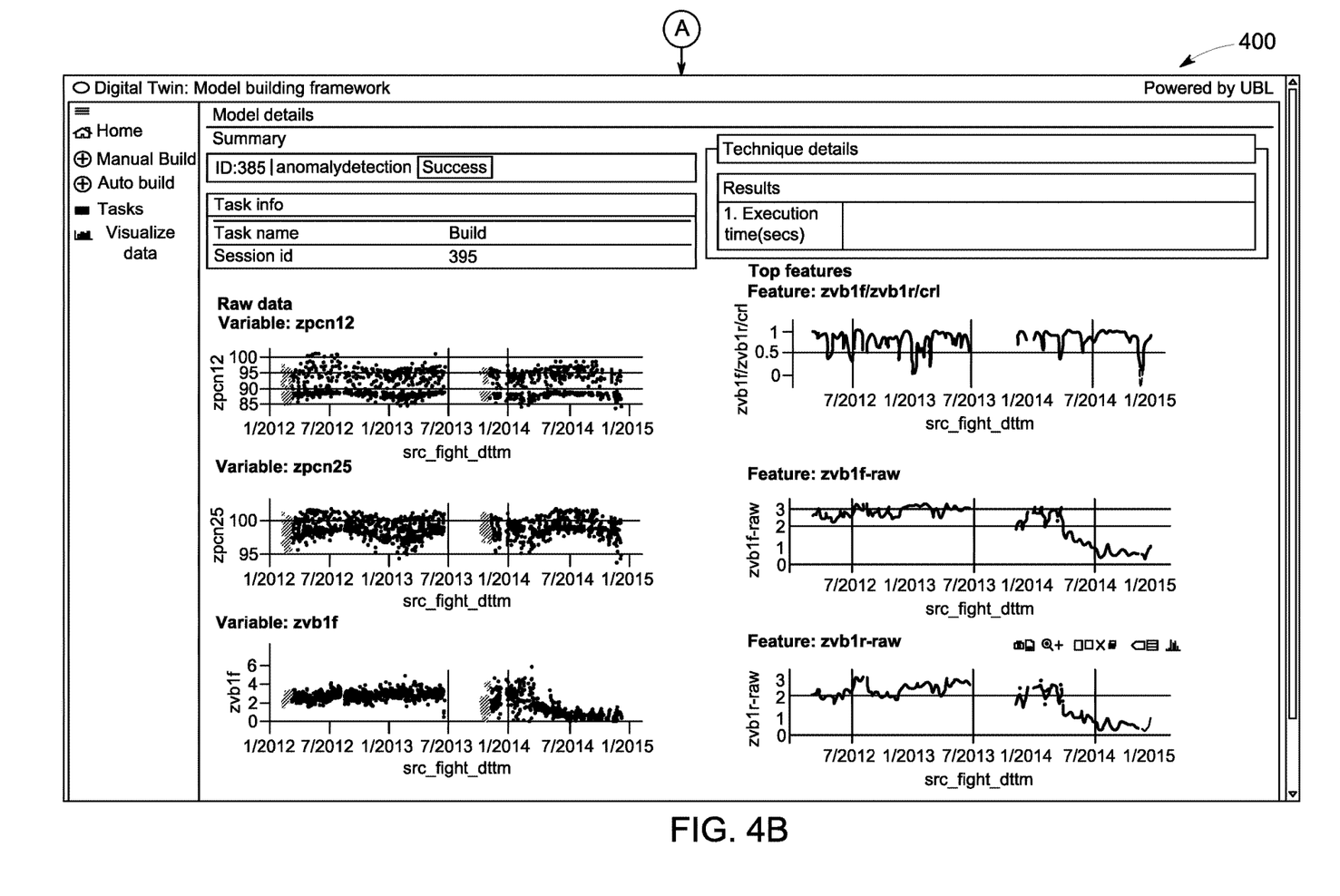
FIG. 4B illustrates an output of a template according to some embodiments.

Now referring to FIG. 4A and FIG. 4B, an embodiment of an output 400 of a template is illustrated according to some embodiments. As illustrated in FIG. 4, execution of a template may produce an output that visually displays the time series data in a format that may be easy for an end user to determine an existence of one or more anomalies in time-series data. As illustrated in FIG. 4, results 402 are illustrated as time-series data associated with a score. A threshold score 404 which was defined in the template is also illustrated. In some embodiments, the threshold score may be illustrated as a dashed line and/or as a different color than the time-series data. As further illustrated in FIG. 4, an anomaly 406 is illustrated as one or more points of the time-series data that exceed the threshold score 404. The anomaly 406 comprises a score that exceeds the threshold score 404. In some embodiments, the anomalous portion of the time series data that is illustrated may be in a contrasting color to the non-anomalous time-series data.

Figure 5:
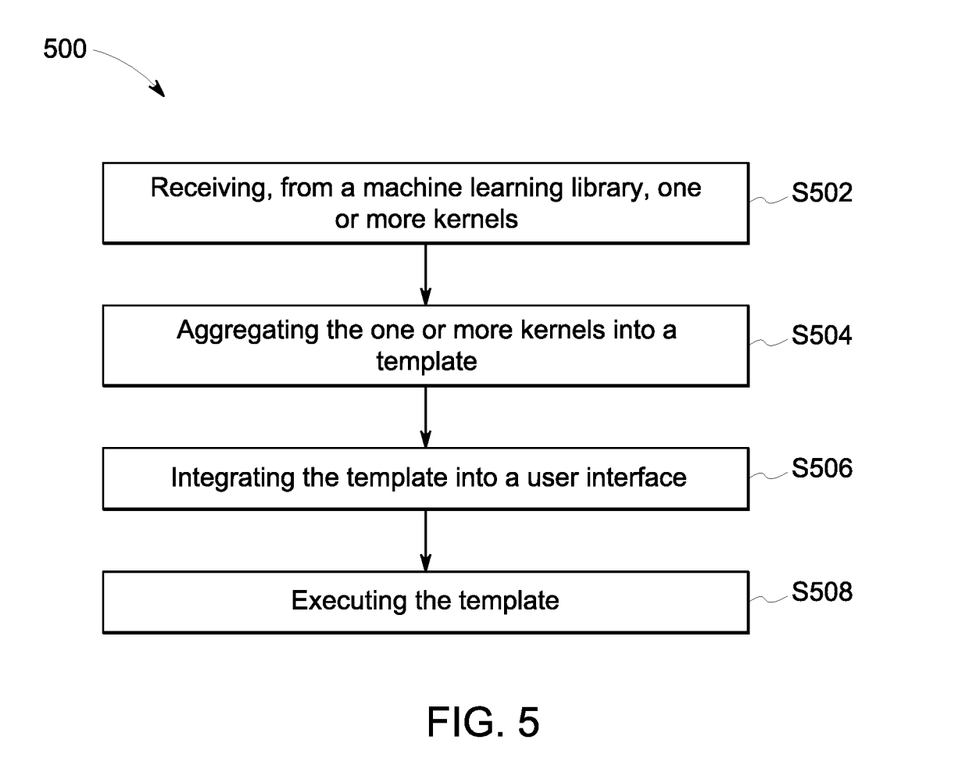
FIG. 5 illustrates a process according to some embodiments.

FIG. 5 illustrates a method 500 that might be performed in conjunction with some or all of the elements of the framework framework 100 described with respect to FIG. 1. The flow chart described herein does not imply a fixed order to the steps, and embodiments of the present invention may be practiced in any order that is practicable. Note that any of the methods described herein may be performed by hardware, software, or any combination of these approaches. For example, a non-transitory computer-readable storage medium may store thereon instructions that when executed by a machine result in performance according to any of the embodiments described herein.

At S502, one or more kernels may be received from a machine learning library. The one or more kernels may be in response to a user creating a template framework in a template editor. The machine learning library may store each of the one or more kernels described with respect to FIG. 1 as well as any default parameters associated with each of the one or more kernels. The machine learning library will be described in more detail with respect to FIG. 6 and FIG. 7.

At S504, the one or more kernels may be aggregated into a template. For example, and as was described with respect to FIG. 1, each of the kernels that are stored in the machine learning library may be developed for a solution of a particular industrial problem in a specific domain and these kernels may be aggregated into the template along with their default parameters. The aggregation of kernels may help facilitate a solution to the particular industrial problem by providing a user with an easier way of viewing data. For example, the aggregation of kernels may facilitate determining anomalies from a plurality of sensor data for users who don't have intimate knowledge about how to manipulate sensor data to provide useable results. As such, providing useable results may facilitate early detection and diagnosis of problems, or potential problems, associated with a machine to avoid loss of use of the machine as well as prevent secondary damage.

At S506, the template may be integrated into a user interface. Integrating the template into a user interface may comprise writing a thin wrapper around the template. The thin wrapper code may accept configuration parameters selected by a user, configure the template using these parameters, and execute building of a template task, or execute predict functionality of the template to produce predictions. Writing the thin wrapper may comprise automatically inserting the template within a system specific software module (e.g. code) that is used for interfacing with a system that executes the template for a specified user interface. For example, a user may be presented with a list of known systems (e.g., operating systems and/or platforms) for selection and a thin wrapper to use may be based on a selected system. The thin wrapper may transparently intercept calls (e.g., API calls) and may change arguments that are passed, handle specific operations on its own, or may redirect the operation (e.g., to other modules associated with a particular user interface) based on the selected system. Integrating the template into the user interface may further comprise using an HTML file to present parameters for a user to review and/or to be modified. These parameters may be used to provide the thin wrapper (e.g., one or more software modules) to integrate the template so that it may function with a specified user interface. For example, based on the parameters in the HTML file, a system may automatically be able to determine a platform/operating system that will be associated with the thin wrapper. Furthermore, to integrate the template into the user interface, JAVASCRIPT (e.g., programming language) and Angular directives to plot results in a graphical format may also be added along with a shell script that allows the template to be called when a template is chosen to be executed. The template, the parameters presented to the user, the thin wrapper, the JAVASCRIPT and Angular directives as well as any dependency software may be added to a container image for the associated with the template. In some embodiments, the container image may comprise a complete file system that contains code, runtime files, system tools, and system libraries so that the template will can be executed regardless of its environment.

At S508, the template may be executed. In some embodiments, when a user selects a template to be executed, the process of executing the template may cause the shell script to be called and calling the shell script may execute the container image. By executing the container image, the template may be executed.

Figure 6:
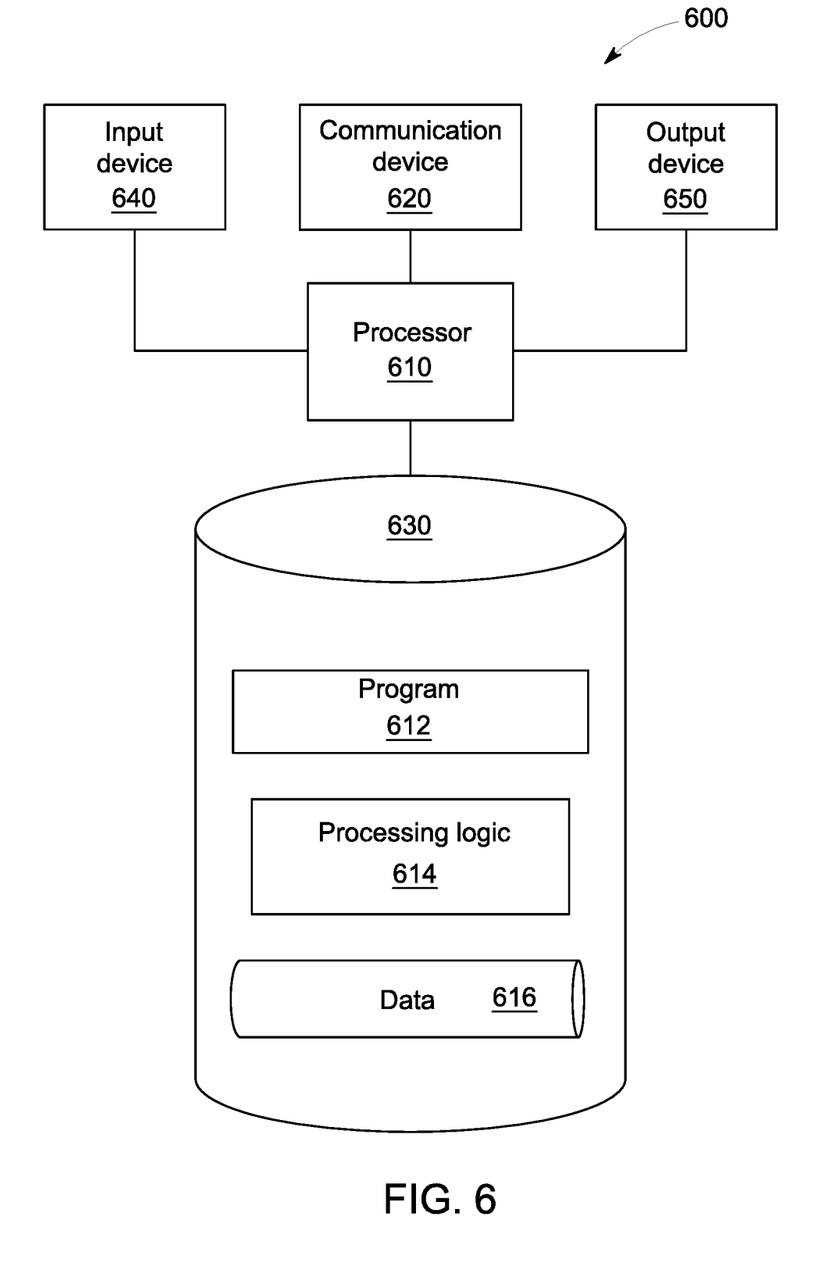
FIG. 6 illustrates a system in accordance with some embodiments.

Note the embodiments described herein may be implemented using any number of different hardware configurations. For example, FIG. 6 illustrates a template framework platform 600 that may be, for example, associated with the template framework 100 of FIG. 1. The template framework platform 600 may comprise a processor 610 ("processor"), such as one or more commercially available Central Processing Units (CPUs) in the form of one-chip microprocessors, coupled to a communication device 620 configured to communicate via a communication network (not shown in FIG. 6). The communication device 620 may be used to communicate, for example, with one or more users such as expert users and non-expert users. The template framework platform 600 further includes an input device 640 (e.g., a mouse and/or keyboard to enter information about the measurements and/or assets) and an output device 650 (e.g., to output and display the data and/or recommendations).

The processor 610 also communicates with a memory/storage device 630 that stores data 616. The storage device 630 may comprise any appropriate information storage device, including combinations of magnetic storage devices (e.g., a hard disk drive), optical storage devices, mobile telephones, and/or semiconductor memory devices. The storage device 630 may store a program 612 and/or processing logic 614 for controlling the processor 610. The processor 610 performs instructions of associated with the programs 612, 614, and thereby operates in accordance with any of the embodiments described herein. For example, the processor 610 may receive data from a machine and may create a template framework based on the data and/or may also determine and display anomalies via the instructions of the programs 612 and processing logic 614.

The programs 612, 614 may be stored in a compiled, compressed, uncompiled and/or encrypted format or a combination. The programs 612, 614 may furthermore include other program elements, such as an operating system, a database management system, and/or device drivers used by the processor 610 to interface with peripheral devices. In some embodiments, the storage device 630 relates to a machine learning library.

As used herein, information may be "received" by or "transmitted" to, for example: (i) the platform 600 from another device; or (ii) a software application or module within the platform 600 from another software application, module, or any other source.

Figure 7:
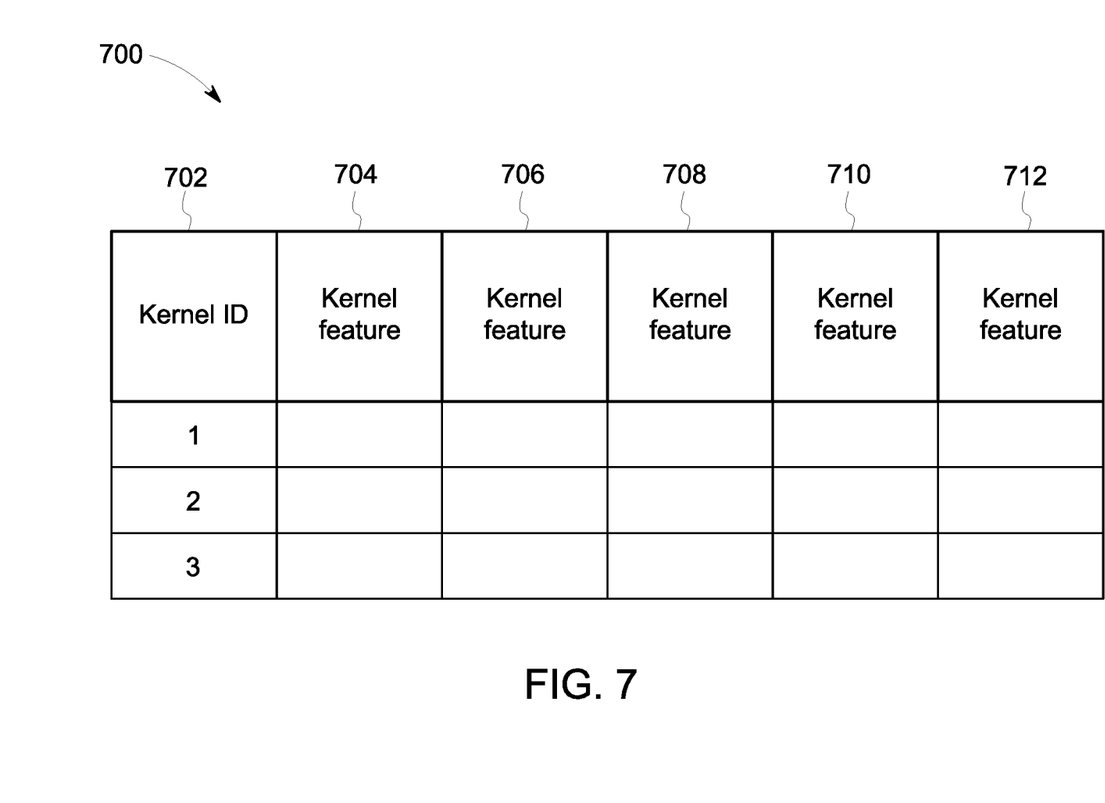
FIG. 7 illustrates a portion of a database table according to some embodiments.

FIG. 7 is a tabular view of a portion of a database 700 in accordance with some embodiments of the present invention. In some embodiments, the database 700 may comprise a machine learning library. The database 700 may be associated with a machine learning library that stores kernels and associated data such as, but not limited to, default values for each of the stored kernels. The table includes entries associated with kernels and default parameters associated with the kernels. The table also defines fields 702, 704, 706, 708, 710, and 712 for each of the entries. The fields specify an kernel ID 702, a first kernel feature 704, a second kernel feature 706, a third kernel feature 708, a 4th kernel feature 710 and an Nth kernel feature 712. The information in the database 700 may be periodically created and updated based on information associated with kernels and their default values.

The kernel ID 702 might be a unique alphanumeric code identifying a specific kernel and the kernel features 704/706/708/710/712 might provide information related to specific features associated with a kernel such as, but not limited to, a name, formula, function, one or more default parameters, domain, etc. but embodiments may be associated with any related kernel data.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the elements depicted in the block diagrams and/or described herein; by way of example and not limitation, a geometrical compensation module. The method steps can then be carried out using the distinct software modules and/or sub-modules of the system, as described above, executing on one or more hardware processors 610 (FIG. 6). Further, a computer program product can include a computer-readable storage medium with code adapted to be implemented to carry out one or more method steps described herein, including the provision of the system with the distinct software modules.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application.

Those in the art will appreciate that various adaptations and modifications of the above-described embodiments can be configured without departing from the scope and spirit of the claims. Therefore, it is to be understood that the claims may be practiced other than as specifically described herein.

The invention claimed is:

1. A method of creating a template associated with an industrial problem, the method comprising:
receiving, from a machine learning library, two or more non-platform specific kernels that are each specific to an industrial related problem including a manifold learning kernel and at least one of a pre-processing kernel, a variable transformation kernel, and a post-processing kernel, wherein the two or more kernels are daisy-chained to pass information between each other using a standardized set of variables;
aggregating, via a wrapper, the two or more kernels into a template; and
integrating the template into a user interface by writing the wrapper around the template including automatically inserting the template within a system specific software module adapted to interface with a template-executing system.

2. The method of claim 1, wherein integrating the template into a user interface further comprises:
adding a container image for the template.

3. The method of claim 2, wherein the container image comprises a complete file system that contains code, runtime files, system tools, and system libraries so that the template can be executed regardless of its environment.

4. The method of claim 2, wherein integrating the template into a user interface further comprises:
adding an html file to present parameters for a user to review and/or modify.

5. The method of claim 4, wherein integrating the template into a user interface further comprises:
adding JAVASCRIPT and Angular directives to plot results in a graphical format.

6. The method of claim 4, wherein integrating the template into a user interface further comprises:
adding shell script for a framework to call when a template is chosen to be executed.

7. The method of claim 6, further comprising:
executing the template wherein execution of the template causes the shell script to be called and the shell script executes the container image.

8. The method of claim 1, wherein the template comprises at least two of data quality assessment algorithms, missing value imputation algorithms, outlier removal algorithms, feature engineering algorithms, classifiers, regressions, anomaly detection algorithms, and post-processing algorithms.

9. The method of claim 1, wherein each of the kernels in the template is adapted to determine a solution to the specific industrial related problem of a specific domain.

10. A non-transitory computer-readable medium comprising instructions that when executed by a processor perform a method associated with an industrial problem, the method comprising:
receiving, from a machine learning library, two or more non-platform specific kernels that are each specific to an industrial related problem including a manifold learning kernel and at least one of a pre-processing kernel, a variable transformation kernel, and a post-processing kernel, wherein the two or more kernels are daisy-chained to pass information between each other using a standardized set of variables;

aggregating, via a wrapper, the two or more kernels into a template;

integrating the template into a user interface by writing the wrapper around the template including automatically inserting the template within a system specific software module adapted to interface with a template-executing system; and executing the template.

11. The medium of claim 10, wherein integrating the template into a user interface comprises:

adding a container image for the template.

12. The medium of claim 11, wherein the container image comprises a complete file system that contains code, runtime files, system tools, and system libraries so that the template can be executed regardless of its environment.

13. The medium of claim 11, wherein integrating the template into a user interface further comprises:

adding html file to present parameters for a user to review and/or modify; and adding JAVASCRIPT and Angular directives to plot results in a graphical format.

14. The medium of claim 13, wherein integrating the template into a user interface further comprises:

adding shell script for a framework to call when a template is chosen to be executed.

15. The medium of claim 14, wherein execution of the template causes the shell script to be called and the shell script executes the container image.

16. A system for detection of problems associated with a machine, the system comprising:

a processor; and a non-transitory computer-readable medium comprising instructions that when executed by the processor perform a method associated with an industrial problem, the method comprising:

receiving, from a machine learning library, two or more non-platform specific kernels that are each specific to an industrial related problem including a manifold learning kernel and at least one of a pre-processing kernel, a variable transformation kernel, and a post-processing kernel, wherein the two or more kernels are daisy-chained to pass information between each other using a standardized set of variables;

aggregating, via a wrapper, the two or more kernels into a template;

integrating the template into a user interface by writing the wrapper around the template including automatically inserting the template within a system specific software module adapted to interface with a template-executing system; and executing the template.

17. The system of claim 16, wherein integrating the template into a user interface comprises:

adding a container image for the template.

18. The system of claim 17, wherein the container image comprises a complete file system that contains code, runtime files, system tools, and system libraries so that the template can be executed regardless of its environment.

19. The system of claim 17, wherein integrating the template into a user interface further comprises:

adding shell script for a framework to call when a template is chosen to be executed.

20. The system of claim 19, wherein execution of the template causes the shell script to be called and the shell script executes the container image.

* * * * *